United States Patent [19]

Shibata

[11] 4,031,684
[45] June 28, 1977

[54] DECORATIVE PRECAST CONCRETE BOARDS AND PROCESS FOR PRODUCING THE SAME

[76] Inventor: Tokuhito Shibata, 1 Nishi-Koike-cho, Toyohashi, Aichi, Japan

[22] Filed: Nov. 11, 1975

[21] Appl. No.: 630,865

Related U.S. Application Data

[63] Continuation-in-part of Ser. No. 482,303, June 24, 1974, abandoned.

[30] Foreign Application Priority Data

Mar. 15, 1974 Japan .............................. 49-029213

[52] U.S. Cl. .................................. 52/612; 52/659; 106/98
[51] Int. Cl.² ........................................... E04B 5/04
[58] Field of Search ..................... 52/612, 316, 659; 106/97, 98

[56] References Cited

UNITED STATES PATENTS

| | | | |
|---|---|---|---|
| 2,703,289 | 3/1955 | Willson | 106/97 X |
| 3,645,961 | 2/1972 | Goldfein | 52/659 UX |

FOREIGN PATENTS OR APPLICATIONS

| | | | |
|---|---|---|---|
| 143,078 | 8/1951 | Australia | 52/612 |

*Primary Examiner*—Price C. Faw, Jr.
*Assistant Examiner*—Carl D. Friedman
*Attorney, Agent, or Firm*—Ladas, Parry, Von Gehr, Goldsmith & Deschamps

[57] ABSTRACT

Decorative precast concrete boards having a pore-free decorative porcelain-tile-like, hewn-stone-like or relief surface and a porous core layer are provided. Such precast concrete boards are produced by applying inorganic cement mortar containing siliceous volcanic sand called "shirasu" in a flat mold made of an elastomeric material so as to form the pore-free surface and pouring thereon an inorganic concrete mortar containing expanded particles of said siliceous sand as the aggregate. The concrete boards do not suffer efflorescence.

6 Claims, 7 Drawing Figures

DECORATIVE PRECAST CONCRETE BOARDS AND PROCESS FOR PRODUCING THE SAME

CROSS REFERENCE TO RELATED APPLICATIONS

This is a continuation-in-part application of Ser. No. 482,303, filed June 24, 1974, now abandoned.

BACKGROUND OF THE INVENTION

This invention relates to a novel precast concrete board for use as the panel or floor tile. More particularly, this invention relates to a novel precast concrete board which has a dense pore-free surface having the appearance of porcelain tile or hewn natural stone and which is provided with better durability, improved adiabatic property and fire resistance, together with water immpermeability and a process for producing the same utilizing industrial wastes and new resources which have never hitherto been utilized.

For the exterior finish in construction works, porcelain tiles and natural stone materials are used. Sometimes sculpture or relief work is applied in situ. Recently, precast concrete boards are widely used. Conventional precast concrete boards for exterior finish have a decorative surface formed by spraying of colored mortar, for instance, and they are superior to the conventional porcelain tiles that are produced by ceramic art, in which much energy is required, and products of larger size cannot be obtained, and they must be applied to the walls by plastering. However, precast concrete boards are inferior to the porcelain tiles in decorative nature and are defective in that efflorescence occurs on their surface.

The known precast concrete boards are made by casting concrete into a knockdown mold made of metal plates to the inside of which a mold release agent has been applied. In this case, through the chinks or the narrow openings between the knockdown mold frames, water flows out and this allows water to diffuse and exude from inside of the concrete mortar that is setting and hardening to the surface thereof, and this causes formation of surface pores or pin holes, and these make the boards water-permeable and cause efflorescence later.

Most of the known precast concrete boards are solid. Therefore, for production thereof, a large amount of precious natural resources such as cement, sand and gravel are required, and the boards themselves are very heavy. The heavy solid boards are not easy to handle, are easily broken when exposed to fire, and are inferior in adiabatic effect.

This invention provides a novel precast concrete board with decorative surface and light porous core or lining in which the above mentioned defects are diminished and relates to a process for production thereof utilizing natural resources which hitherto have not been utilized, too.

Prior to this invention of mine varieties of materials of this kind were known. For instance, in U.S. Pat. No. 1,702,730, a laminated wall product comprising in combination two dense hard facings and an intermediate core of cellular texture is disclosed. This is a gypsum board, and therefore inferior in the decorative effect. The cellular structure of the core layer is formed by effervescence in the reaction of the added acid (sulfuric acid) and carbonates contained in gypsum as impurities. When the carbonate content is insufficient, carbonates are added. Therefore quality control in the production thereof is extremely difficult and use of such a strong acid is not desirable.

In U.S. Pat. No. 2,021,359, a sound absorbing wall material is disclosed, which comprises a pad of felted fibers coated by water-proofing film, said fibers being confined in walls of cementinous material. This wall material is intended for sound absorption and therefore inferior in fire resistance and strength.

In U.S. Pat. No. 2,152,190, a building block having a light weight cellular body and a dense strong outer layer enclosing said body. In this patent it is not mentioned how the light weight cellular core cement body is made. It is surmised that it is made by foaming or air-entraining in the cement mortar. This requires a rather large scale apparatus and quality control is extremely difficult.

As seen in the above, cellular structure of inorganic cement material was formed by chemical effervescence or physical foaming. These techniques were not satisfactory in that they require rather large scale apparatus and quality control was very difficult.

However, the deficiency of the prior art has been removed by employment of a siliceous volcanic sand.

The above-mentioned siliceous volcanic sand is the one called shirasu in Japan that is found in abundance in volcanic zones in Japan, Taiwan and some other Asian countries. Although little is known about the origine thereof, it is believed that shirasu includes both flow-out and fall-out. It is found in the form of easily degraded sand mass. It is siliceous and therefore has good affinity to alkaline material. Recently it has been found that when it is heated, the sand particles swell and become minute balloons. I found that the expanded and non-expanded shirasu are inexpensive excellent aggregate and filler for the concrete board of this invention.

SUMMARY OF THE INVENTION

In accordance with this invention, a novel precast concrete board free from surface pores or pin holes, comprising smooth marble-like surface, decorative relief surface, or rough hewn-stone-like surface, etc. containing the undermentioned siliceous volcanic sand and a porous core or lining containing the expanded siliceous volcanic sand as explained below as the aggregate is provided.

Such a novel precast concrete board is produced by applying a cement mortar of desired color containing fine fillers of the siliceous volcanic sand as the surface layer in a flat mold integratedly made of an elastomeric material the side frames of which are inversely tapered so that the upper or outer ends thereof are thicker or wider than the bottom end thereof and the bottom of which has a smooth surface or a negative relief pattern or a hewn-stone-like surface; and pouring a concrete mortar containing as the aggregates expanded siliceous volcanic sand as explained below.

For the concrete board of this invention, shirasu siliceous volcanic sand not expanded is suitable to be used as the filler for the decorative surface layers, and the expanded shirasu siliceous volcanic sand is suitable to be used as the aggregate for the core layer or lining. By the use of the non-expanded and expanded shirasu siliceous volcanic sand, decorative pre-cast concrete boards with hard and dense pore-free surface and light adiabatic core or lining are produced.

In the surface layer mortar, used casting mold sand and other particles of industrial wastes can be incorporated in addition to the shirasu siliceous volcanic sand. In the core board concrete, chopped plastics, chopped foamed prastics, waste fiber, cinder, pumice, scoria etc. can be incorporated in addition to the expanded siliceous volcanic sand.

Standard shirasu siliceous volcanic sand comprises: 65 – 73% by weight of silicam 12 – 16% by weight of alumina, 1 – 3% by weight of iron. Although it is used as is for the purpose of this invention, it is desirable to use shirasu sand which has been enriched in silica by means gravity concentration (ore dressing). Usually mined shirasu siliceous volcanic sand is finely pulverized and is concentrated with respect to silica until the silica content becomes 75% or more by means of gravity concentration (ore dressing).

When the silica-enriched shirasu sand is heated at about 1300° C, it is expanded and becomes fine hollow sphere, which is called "shirasu balloon." The expanded shirasu sand is very suitable as aggregates for the core or lining layer of the concrete board of this invention.

As the similar material "Micro balloon" marketed by Emerson Cumming, Inc. is known. But this is 20 times as high-priced as the shirasu balloon.

The surface layer cement mortar usually comprises:

| | |
|---|---|
| Portland cement, white portland cement or alumina cement | 1 part by weight |
| Filler (non-expanded "shirasu" siliceous volcanic sand, used casting mold, etc. less than 0.5 mm in particle diameter) | 1 – 3 parts by weight |
| Water | 0.4 – 0.6 parts by weight |
| Mortar additive (organic resin binder, acceleraor, etc.) | up to 20% by weight of used water |

Of all the fillers, the non-expanded shirasu siliceous volcanic sand should occupy at least 30% by weight, preferably not less than 50% by weight, and most preferably about 70% by weight. The remaining 30% is reserved for other modifying ingredients. But siliceous volcanic sand may occupy 100%.

The core or lining layer concrete mortar usually comprises:

| | |
|---|---|
| Portland cement | 1 part by weight |
| Aggregate | 4 – 6 parts by weight |
| Filler | 1 – 3 parts by weight |
| Mortar additive (organic resin binder, accelerator, etc.) | up to 20% by weight of the used water |

As the aggregate, various materials as mentioned above can be used. However, expanded shirasu siliceous volcanic sand should occupy at least 10% by weight of all the aggregates preferably not less than 30%, at the highest 70%, whereby the remaining 30% is reserved for other modifying and strengthening ingredients.

Usually a large flat mold containing a plurality of recesses so that a plurality of boards can be made at one time. It is essential to place the mold on a rigid flat surface when the boards are produced. By the use of accelerating agents, the formed concrete boards will be ready for removal from the mold in a very short period of time.

Although it is not essential, it is desirable to apply a layer of fine filler mortar again on the top of the core layer so that a sandwich structure is formed.

In one aspect of this invention, the core or lining layers can be made separately beforehand and then be embedded in the surface layer which has been applied to the bottom of the flat mold and has not yet set or hardened. In this case, to make a sandwich structure the core layer can be made smaller in length and width and thickness than the final concrete board so that not only the surface area but also the back and the four sides of the board may be covered with the dense surface layer. If necessary, reinforcing wires or bars can be embedded in the core layer of the precast concrete boards of this invention.

When the core layers are produced separately, the flat mold for making the concrete boards themselves can be used by applying knockdown (temporary) inside frames inside the mold as explained in detail later.

It is desirable to incorporate mortar additives such as organic binder in the surface layer mortar, and core layer mortar, too. Thus especially good precast concrete boards can be produced.

The thickness of the surface layer is 5 – 10% of the total thickness of the finished board.

The thickness of the core layer is 95 – 90% of the total thickness of the finished board. When the sandwich structure is employed the thickness of the core layer is 90 – 80% of the total thickness.

DETAILED DESCRIPTION OF THE INVENTION

Now the invention is explained in detail with reference to the drawings and by way of working examples.

Figure 1:
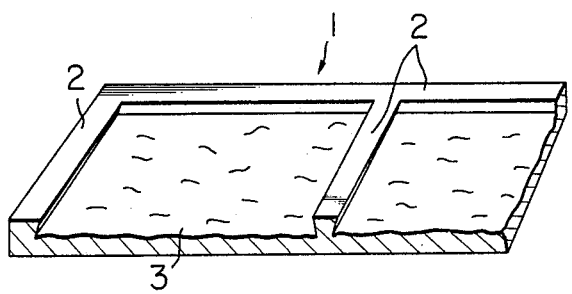
FIG. 1 is a perspective view of the flat mold made of an elastomeric material in accordance with this invention partly shown in section.
Figure 2:
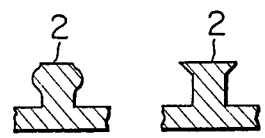
FIG. 2 shows other configurations of the section of the frames of the flat mold shown in FIG. 1.

In FIG. 1, the flat mold is as a whole shown as 1, mold frames by 2, and mold bottom by 3. As shown in the drawing, the frames in cross section form an inversed truncate. The form of the mold frames are not necessarily limited to the inversed truncate, but they can be modified as shown in FIG. 2. In any case, the upperside must be wider than the bottom side. By adopting this configuration, the mold of an elastomeric material can bear the pressure of the filled concrete mortar and keep the proper form. And the formed concrete board are, on the bottom side, provided with recess in each of the four sides in which binding or calking material can be filled when they are used in interior or exterior finish work.

Figure 3:
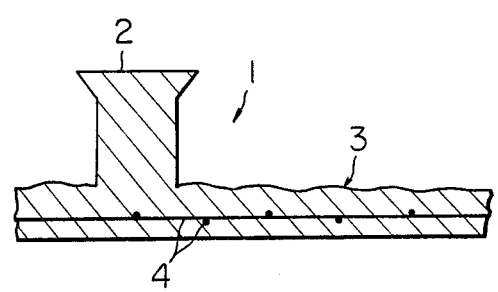
FIG. 3 is a cross sectional view of the flat mold of an elastomeric material in which a network of reinforcing wires are embedded.
Figure 4:
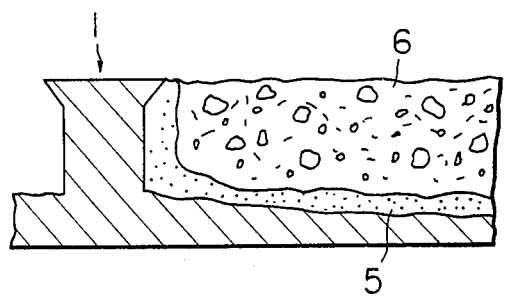
FIG. 4 is a cross sectional view of the flat mold in which a surface layer and a core layer are formed.
Figure 5:
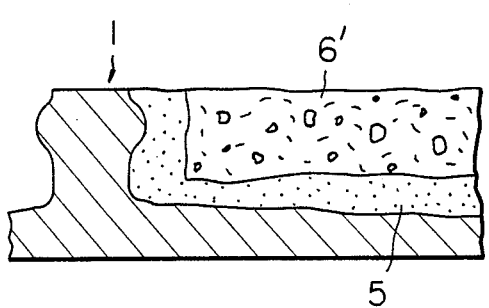
FIG. 5 is a cross sectional view of the flat mold in which a preformed core board is embedded in a surface layer.

When larger boards are produced, it is desirable to reinforce the elastomer mold with some embedded reinforcing wires as shown in FIG. 3 or with a canvas backing sheet. Such molds can be made in accordance with the conventional technique. As the material for the molds, silicone rubber is the best but it is very expensive, and therefore in practice urethane rubber is the best compromise.

In the following examples, all parts are those by weight, and shirasu siliceous volcanic sand which had been concentrated to at least 75% in silica content was used.

EXAMPLE 1

A flat mold with inverse-tapered frames, of which the inside length is 1,000 mm, width is 300 mm both at the bottom side, and depth is 30 mm, was integratedly made of urethane rubber by the conventional technique. The bottom was provided with decorative relief pattern.

A cement mortar consisting of:
 4 parts white portland cement
 8 parts fine shirasu siliceous volcanic sand (not expanded)
 0.2 part red inorganic pigment
 0.12 part green inorganic pigment
 2 parts water
 0.2 part Mo-Vinyl 200 (supplied by Hoechst-Gosei)
was applied to the inside of the mold by means of a cement gun in a thickness of 5 – 7 mm so as to form a surface layer.

Before the thus formed surface layer hardened, a concrete mortar consisting of:
 20 parts waste casting mold sand
 30 parts iron smelting slag
 10 parts expanded shirasu siliceous volcanic sand
 20 parts crushed volcanic clastic rock
 10 parts crushed pearlite
 5 parts chopped waste phenol-resin bound asbestos
 5 parts chopped waste synthetic fiber
 10 parts portland cement
 5 parts water containing 10% epoxy resin emulsion (Mo-Vinyl 200)
was poured over the surface layer and was hardened and cured. Thus a decorative precast concrete board was obtained.

EXAMPLE 2

In a urethane rubber flat mold having a plurality of casting recesses 20 mm in depth, 200 mm in width and 200 mm in length with inverse-tapered frames, a cement mortar consisting of:
 1 part alumina cement
 3 parts non-expanded shirasu siliceous volcanic sand
 0.5 part water
was poured to a thickness of 5 mm and vibration was applied so as to make the mortar gel in the mold.

Before the surface layer hardened, a concrete mortar consisting of:
 1 part iron smelting slag
 1 part dust from a dust collector
 1 part waste casting mold sand
 2 parts expanded siliceous volcanic sand (shirasu)
 1 part chopped synthetic fiber
 1 part portland cement
 0.5 part silica powder
 0.5 part water containing commercially available accelerator
was poured on the surface layer. Thus concrete boards which are used for floor tiles having a completely pore-free surface were obtained after curing.

The bending strength of the thus obtained tile was about 140 – 190 kg/cm², which was of the same level as the conventional porcelain tiles. The tiles have porcelain-like color and lustre.

EXAMPLE 3

Figure 6:
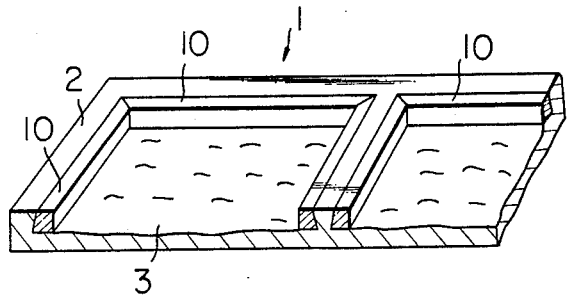
FIG. 6 is a perspective view of the flat mold inside of which knockdown inside frames are applied, shown partly in section.
Figure 7:
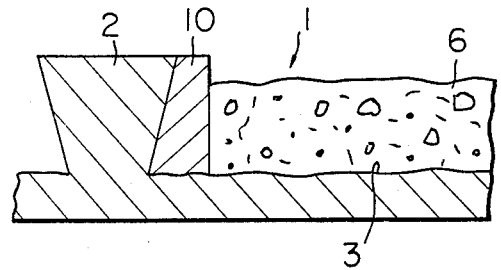
FIG. 7 is a cross sectional view showing the use of inside frames as shown in FIG. 6.

Inside a recess 40 mm in depth, 500 mm in width and 1,000 mm in length with inverse-tapered frames, the bottom thereof having a hewn-stone-like surface, inside frames about 10 mm in thickness as shown in FIG. 6 were placed.

Two (2) parts by weight of chopped foamed polystyrene and 1 part by weight of carbide lime was mixed in a small concrete mixer with addition of a small amount of water to wet the lime by spraying until the foamed polystyrene particles were well covered by carbide lime. Thereafter, 1 part portland cement, 1 part chopped waste synthetic fiber (waste rope), and 1 part waste expanded shirasu siliceous volcanic sand were added. To this mixture water containing a commercially available 15% polyvinyl acetate emulsion (Elvacet 81 – 900, Du Pont) was sprayed and the mixture was agitated until the mixture had workable fluidity. The thus formed concrete mortar was poured into the above explained flat mold with inside frames to the thickness of 35 mm and was hardened and cured.

The thus formed concrete board was released from the mold, the inside frames were removed from the flat mold.

The mechanical properties of the thus obtained core concrete board were:
 Compressive strength: 52 – 57 kg/cm²
 Tensile strength: 8 – 10 kg/cm²
 Shearing strength: 25 – 30 kg/cm²
 Bending strength: 9 – 10 kg/cm²
 Bulk density: 0.75 – 0.85 g/cm³

The bulk density of the cellular core concrete board prepared in accordance with this invention can be varied between 0.5 – 1.0 g/cm³ by varying the amount of expanded shirasu siliceous volcanic sand to be used. All the cellular or foamed concrete boards of the prior art gradually absorb water and sink finally although they initially float on the surface of water. In contrast, the cellular concrete boards made as mentioned above remain floating forever.

Into the mold without inside frames, a mortar consisting of:
 13 parts white portland cement
 26 parts fine shirasu siliceous volcanic sand
 6.5 parts water containing 10% polyvinyl acetate resin emulsion
was poured to the thickness of 5 mm so as to form the surface layer.

On the thus formed surface layer, the above-explained concrete board was placed and burried so that the gap between the board and the frames of the mold was filled with the surface layer mortar.

After curing, a precast concrete board of this invention was obtained.

The mechanical and chemical properties of the product of Example 1 are as follows.
 Weatherability
  Outdoor exposure: No change after 1 year.

In weatherometer: No change after 1,000 hours.
Efflorescence does not occur.

Water permeability
  No water permeation after 250 mm water head was applied for 7 days.

Impact strength
  No change when suffering drop impact of 150 kg/cm$^2$.

Surface hardness
  Rockwell: 48
  Scratch:
    0.5 kg, 0.24 mm;
    1.0 kg, 0.33 mm;
    2.0 kg, 0.56 mm.

These scratch values are higher than those of the ordinary concrete board approximately by factor of 2. It is believed that this is a result of the use of shirasu siliceous volcanic sand which is highly acidic.

Freeze and thaw test
  No change after 10 cycles of 8 hours at −20° C and 6 hours at 20° C.

Resistance to acid
  When contacted with 5% hydrochloric acid, no change after 30 days. When contacted with concentrated sulfuric acid, swells and is whitened. Ordinary concrete boards made of portland cement and common sand immediately effervesces when contacted with 5% hydrochloric acid. This is a remarkable feature of this invention.

Resistance to alkali
  When contacted with saturated Ca(OH)$_2$ solution, no change after 30 days.

Resistance to washing
  No change after 500 cycles of to-and-fro test by Gardener straight type washability test machine. Ordinary concrete boards exhibit abrasion after about 250 cycles.

Fire resistance
  Heating source: 1.5 KW/h,
  Auxiliary heating source: 1.5 KW/min.
  Melting over the whole thickness: Does not occur.
  Cracking over the whole thickness: Does not occur.
  Evolution of noxious gas: Does not occur.
  Intolerable deformation: Does not occur.

All the above tests are based on the test methods described in Japanese Industrial Standards A-5410, Z-2245, A-5703 and A-1321.

It was known to use volcanic ash as the material for inorganic cements. But it has not been known to use such a highly silicic volcanic ash as shirasu as the aggregate or filler, especially expanded silicic volcanic sand.

What I claim is:

1. A decorative precast concrete board comprising at least one surface layer and a core layer, the four edges of which recede or are indented toward the back side, said surface layer being made of an inorganic cement mortar containing non-expanded shirasu at least in an amount that said sand occupies at least 30% by weight of the total amount of the dry ingredients, and said core layer being made from an inorganic concrete mortar containing fine hollow spherical expanded shirasu in an amount that said expanded sand occupies 10 – 70% by weight of the total amount of the dry ingredients.

2. The decorative precast concrete board as claimed in claim 1, wherein the siliceous volcanic sand contains at least 75% by weight of silica.

3. The decorative precast concrete board as claimed in claim 2, wherein the core layer has incorporated therein chopped synthetic fiber.

4. The decorative precast concrete board as claimed in claim 2, wherein the thickness of the surface layer is 5 – 10% of the total thickness of the finished board, and the thickness of the core layer is 95 – 80% of the total thickness of the finished board.

5. The decorative precast concrete board as claimed in claim 4, wherein the inorganic cement mortar for the surface layer contains not less than 50% by weight of shirasu and the inorganic cement mortar for the core layer contains 30 – 70% by weight of siliceous volcanic sand (shirasu).

6. The decorative precast concrete board as claimed in claim 5, wherein the inorganic cement mortar for the surface layer contains not less than 70% by weight of shirasu and the inorganic cement mortar for the core layer contains 50 – 40% by weight of shirasu.

* * * * *